US008295955B2

(12) United States Patent
DiBernardo et al.

(10) Patent No.: US 8,295,955 B2
(45) Date of Patent: *Oct. 23, 2012

(54) METHODS AND APPARATUS FOR POSITION ESTIMATION USING REFLECTED LIGHT SOURCES

(75) Inventors: Enrico DiBernardo, Glendora, CA (US); Paolo Pirjanian, Glendale, CA (US)

(73) Assignee: Evolutions Robotics, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,075

(22) Filed: Aug. 5, 2011

(65) Prior Publication Data
US 2012/0022785 A1      Jan. 26, 2012

Related U.S. Application Data

(63) Continuation of application No. 12/780,746, filed on May 14, 2010, now Pat. No. 7,996,097, which is a continuation of application No. 11/090,621, filed on Mar. 25, 2005, now Pat. No. 7,720,554.

(60) Provisional application No. 60/557,252, filed on Mar. 29, 2004.

(51) Int. Cl.
*G05B 19/18* (2006.01)
(52) U.S. Cl. .............................. 700/56; 700/59; 701/114
(58) Field of Classification Search .................... 700/56, 700/59; 701/207
See application file for complete search history.

(56) References Cited

U.S. PATENT DOCUMENTS

| 4,710,020 A | 12/1987 | Maddox et al. |
| 4,846,297 A * | 7/1989 | Field et al. ..................... 180/169 |
| 5,002,501 A | 3/1991 | Tucker |
| 5,155,684 A | 10/1992 | Burke et al. |
| 5,258,822 A | 11/1993 | Nakamura et al. |
| 5,844,232 A | 12/1998 | Pezant |

(Continued)

FOREIGN PATENT DOCUMENTS
DE          4338841 A1       5/1995
(Continued)

OTHER PUBLICATIONS

Becker, C.; Salas, J.; Tokusei, K.; Latombe, J.-C.; Robotics and Automation, 1995. Proceedings, 1995 IEEE International Conference on Robotics and Automation vol. 1, May 21-27, 1995 pp. 401-406 vol. 1.

(Continued)

*Primary Examiner* — Timothy A Brainard
(74) *Attorney, Agent, or Firm* — Knobbe, Martens, Olson & Bear LLP

(57) ABSTRACT

The invention is generally related to the estimation of position and orientation of an object with respect to a local or a global coordinate system using reflected light sources. A typical application of the method and apparatus includes estimation and tracking of the position of a mobile autonomous robot. Other applications include estimation and tracking of an object for position-aware, ubiquitous devices. Additional applications include tracking of the positions of people or pets in an indoor environment. The methods and apparatus comprise one or more optical emitters, one or more optical sensors, signal processing circuitry, and signal processing methods to determine the position and orientation of at least one of the optical sensors based at least in part on the detection of the signal of one or more emitted light sources reflected from a surface.

20 Claims, 3 Drawing Sheets

U.S. PATENT DOCUMENTS

| | | | |
|---|---|---|---|
| 5,940,170 A | 8/1999 | Berg et al. | |
| 6,278,917 B1 | 8/2001 | Bauer et al. | |
| 6,389,329 B1 | 5/2002 | Colens | |
| 6,459,955 B1 | 10/2002 | Bartsch et al. | |
| 6,504,610 B1 | 1/2003 | Bauer et al. | |
| 6,629,028 B2 | 9/2003 | Paromtchik et al. | |
| 6,654,482 B1 | 11/2003 | Parent et al. | |
| 6,906,702 B1 | 6/2005 | Tanaka et al. | |
| 7,069,124 B1 | 6/2006 | Whittaker et al. | |
| 7,075,661 B2 | 7/2006 | Petty et al. | |
| 7,720,554 B2* | 5/2010 | DiBernardo et al. | 700/56 |
| 7,996,097 B2* | 8/2011 | DiBernardo et al. | 700/56 |
| 2001/0013929 A1 | 8/2001 | Torsten | |
| 2002/0016649 A1 | 2/2002 | Jones | |
| 2002/0104963 A1 | 8/2002 | Mancevski | |
| 2002/0159051 A1 | 10/2002 | Guo | |
| 2003/0058262 A1 | 3/2003 | Sato et al. | |
| 2003/0193657 A1 | 10/2003 | Uomori et al. | |
| 2003/0208304 A1 | 11/2003 | Peless et al. | |
| 2003/0233870 A1 | 12/2003 | Mancevski | |
| 2004/0125461 A1 | 7/2004 | Kawamura | |
| 2005/0000543 A1 | 1/2005 | Taylor et al. | |
| 2005/0010330 A1 | 1/2005 | Abramson et al. | |
| 2005/0033124 A1 | 2/2005 | Kelly et al. | |
| 2005/0213109 A1 | 9/2005 | Schell et al. | |
| 2007/0045018 A1* | 3/2007 | Carter et al. | 180/167 |
| 2011/0125323 A1* | 5/2011 | Gutmann et al. | 700/258 |

FOREIGN PATENT DOCUMENTS

| | | |
|---|---|---|
| EP | 0479273 A | 4/1992 |
| EP | 0 798 567 | 10/1997 |
| EP | 0294101 A | 12/1998 |
| FR | 2601443 A | 1/1998 |
| GB | 2284957 A | 6/1995 |
| JP | 59-112311 | 6/1984 |
| JP | 59112311 A | 6/1984 |
| JP | 59184917 A | 10/1984 |
| JP | 60089213 A | 5/1985 |
| JP | 5-257527 | 10/1993 |
| JP | 05257527 A | 10/1993 |
| JP | 05285861 A1 | 11/1993 |
| JP | 10-27018 | 1/1998 |
| JP | 2001-522079 | 11/2001 |
| JP | 2002-82720 | 3/2002 |
| JP | 2003-515210 | 4/2003 |
| WO | WO 99/23543 | 5/1999 |
| WO | WO 01/37060 | 5/2001 |

OTHER PUBLICATIONS

Becker C. et al.: "Reliable navigation using landmarks" Proceedings of the Int'l Conf. on Robotics and Automation, May 21-27, 1995, New York, IEEE, US vol. 1, May 21, 1995.

International Search Report for PCT/US05/010200, dated Aug. 2, 2005.

International Search Report for PCT/US05/010244, dated Aug. 2, 2005.

Japanese Office Action, JP Patent Application No. 2007-506413, dated May 26, 2010, English Translation and Japanese Office Action.

* cited by examiner

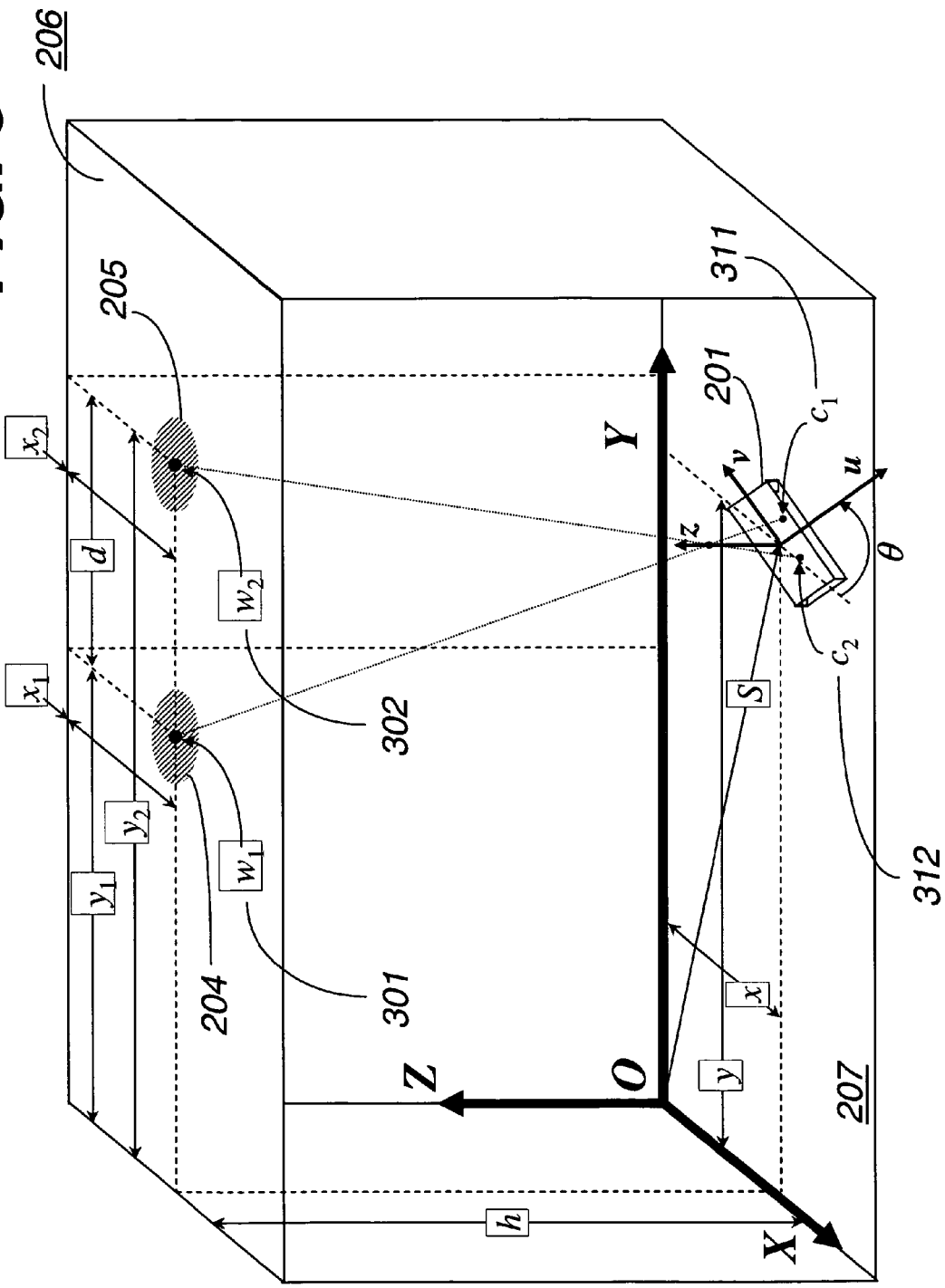

METHODS AND APPARATUS FOR POSITION ESTIMATION USING REFLECTED LIGHT SOURCES

RELATED APPLICATION

This application claims the benefit under 35 U.S.C. §119(e) of U.S. Provisional Application No. 60/557,252, filed Mar. 29, 2004, the entirety of which is hereby incorporated by reference.

APPENDIX A

Appendix A, which forms a part of this disclosure, is a list of commonly owned co-pending U.S. patent applications. Each one of the co-pending applications listed in Appendix A is hereby incorporated herein in its entirety by reference thereto.

BACKGROUND OF THE INVENTION

1. Field of the Invention

This invention generally relates to the estimation of position and orientation of an object with respect to a local or a global coordinate system. In particular, the invention relates to the method and apparatus that provides estimation and tracking of the position and orientation. The method and apparatus that can be used in vehicles, such as in mobile robots.

2. Description of the Related Art

Position estimation is a topic of interest for a wide variety of application areas ranging from autonomous mobile robots, ubiquitous computing, mobile devices, tracking of assets, tracking of people, position tracking of customers in a store, tracking of pets, position of nodes in ad hoc wireless networks, position tracking of vehicles, and position tracking of mobile devices such as cell phones, personal digital assistants, and the like.

Robots are becoming more and more commonplace in society. It will be understood that these robots can be embodied in a variety of forms, such as in automated floor care products such as vacuum cleaners. A variety of applications can be found for mobile robots, such as, but not limited to, entertainment applications such as toy robots, healthcare applications such as elderly care robots, patrolling and security applications, telepresence robots, cleaning applications such as floor cleaning robots, utility applications in environments that are unfriendly to humans such as space, deep water, cold temperature, radiation, chemical exposure, biohazards, etc., dangerous tasks such as defusing of potential explosives, operation in confined spaces such as collapsed buildings, and the performance of menial tasks such as cleaning. Mobile robots, robots that can move from one location to another, often use knowledge of their position relative to their environment.

Localization techniques refer to processes by which a robot determines its position and orientation relative to a reference coordinate system. The reference coordinate system can be either local (for example, relative to an object of interest) or global. Position estimation can include estimation of any quantity that is related to at least some of an object's six degrees of freedom of in three dimensions (3-D). These six degrees of freedom can be described as the object's (x, y, z) position and its angles of rotation around each axis of a 3-D coordinate system, which angles are denoted $\alpha$, $\beta$, and $\theta$ and respectively termed "pitch," "roll," and "yaw." Such position estimation can be useful for various tasks and application. For example, the bearing of a robot relative to a charging station can be useful for allowing the robot to servo to the charging station and recharge its batteries autonomously. The estimation of the distance of a pet from the front door can be used to alert the owner about a possible problem. For indoor environments, it is typically desired to track the (x, y) position of an object in a two-dimensional (2-D) floor plane and its orientation, $\theta$, relative to an axis normal to the floor plane. That is, it can be convenient to assume that a z coordinate of the robot, as well as the robot's roll and pitch angles, are constant. The (x, y) position and the $\theta$ orientation of an object are referred to together as the pose of the object.

Numerous devices, processes, sensors, equipment, and mechanisms have been proposed for position estimation. These methods can be divided into two main categories. One category uses beacons in the environment to enable position estimation, and the second category uses natural landmarks in the environment. Because the method and apparatus described herein fall into the first category of beacon-based position estimation or localization, this section will focus on beacon-based localization methods.

Beacons are artificial devices in the environment that can be detected by an appropriate sensing apparatus. Beacons can be passive or active. Examples of passive beacons include retroreflective materials. By projecting a light source onto a retroreflective material, one can create a signature or signal that can be detected readily using one or more appropriate optical sensors. Using the signature or signal, the one or more sensors can determine their positions relative to the beacons and/or relative to the environment.

Active optical beacons emit light that can be detected by an optical sensor. The optical sensor can measure various characteristics of the emitted light, such as the distance to the emitter (using time-of-flight), the bearing to the emitter, the signal strength, and the like. Using such characteristics, one can estimate the position of the sensor using an appropriate technique, such as triangulation or trilateration. These approaches, which use active optical beacons paired with optical sensors, are disadvantageously constrained by line-of-sight between the emitters and the sensors. Without line-of-sight, a sensor will not be able to detect the emitter.

SUMMARY OF THE INVENTION

Embodiments described herein are related to methods and apparatus for the estimation of the position and orientation of a device, such as a robot, relative to a global or local reference frame. The apparatus described herein comprises an optical sensor, an optical emitter, and associated signal processing circuitry. The poses of the sensors are typically unknown, and the apparatus and methods described herein can be used to measure or estimate the pose of at least one sensor and the position of an emitter projection on a surface.

A typical application of the method and apparatus includes estimation and tracking of the position of a mobile autonomous robot. Other applications include estimation and tracking of an object for position-aware, ubiquitous devices. Additional applications include tracking of the positions of people or pets in an indoor environment. The methods and apparatus comprise one or more optical emitters, one or more optical sensors, signal processing circuitry, and signal processing methods to determine the position and orientation of at least one of the optical sensors based at least in part on the detection of the signal of one or more emitted light sources reflected from a surface.

BRIEF DESCRIPTION OF THE DRAWINGS

These and other features of the invention will now be described with reference to the drawings summarized below.

These drawings (not to scale) and the associated descriptions are provided to illustrate preferred embodiments of the invention and are not intended to limit the scope of the invention.

FIG. 3 illustrates a geometrical model associated with one embodiment.

GLOSSARY OF TERMS

Figure 1:
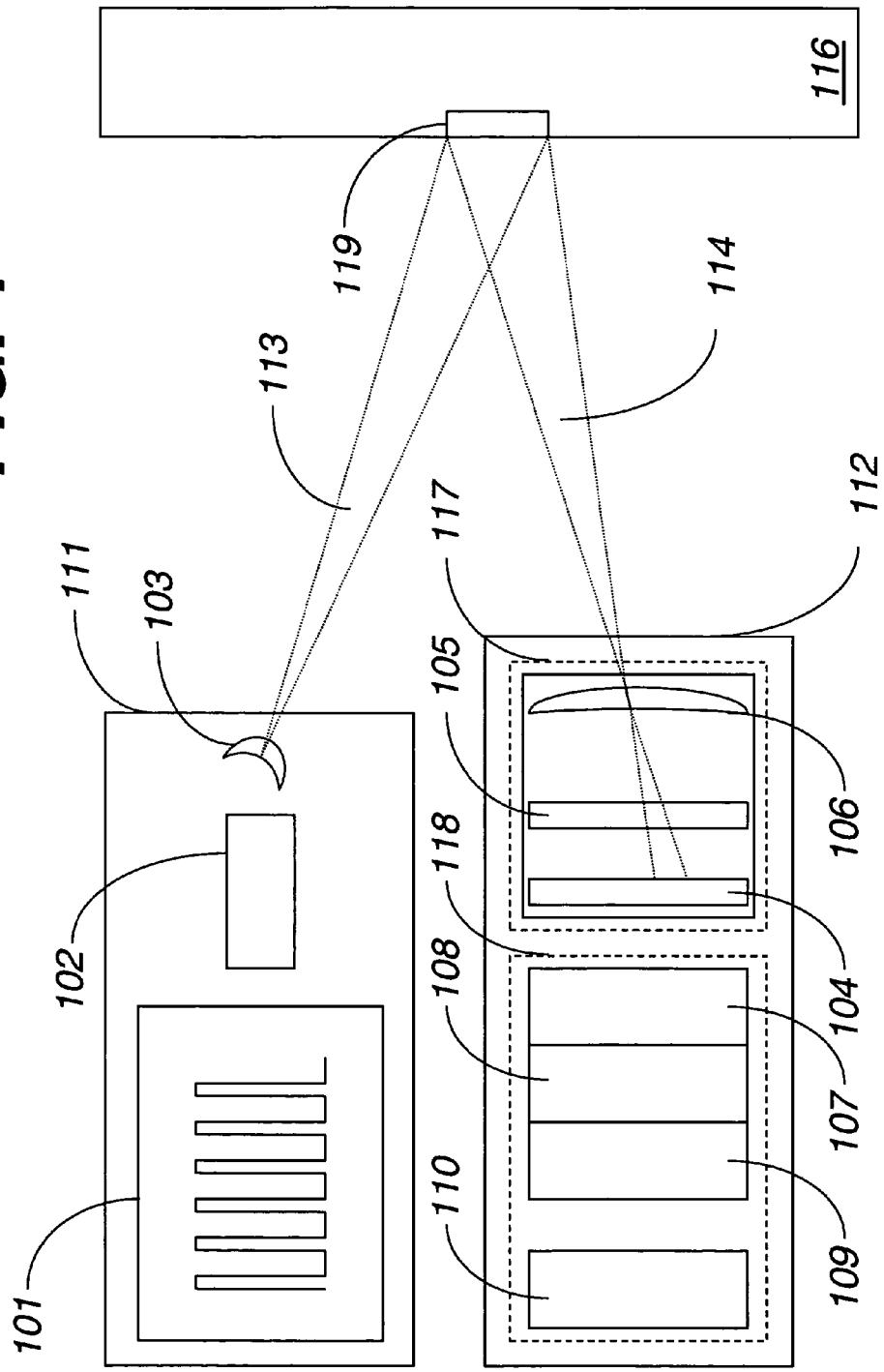
FIG. 1 is a block diagram illustrating one implementation of an apparatus for position estimation.

Pose: A pose is a position and orientation in space. In three dimensions, pose can refer to a position (x, y, z) and an orientation ($\alpha$, $\beta$, $\theta$) with respect to the axes of the three-dimensional space. In two dimensions, pose can refer to a position (x, y) in a plane and an orientation $\theta$ relative to the normal to the plane.

Optical sensor: An optical sensor is a sensor that uses light to detect a condition and describe the condition quantitatively. In general, an optical sensor refers to a sensor that can measure one or more physical characteristics of a light source. Such physical characteristics can include the number of photons, the position of the light on the sensor, the color of the light, and the like.

Position-sensitive detector: A position-sensitive detector, also known as a position sensing detector or a PSD, is an optical sensor that can measure the centroid of an incident light source, typically in one or two dimensions. For example, a PSD can convert an incident light spot into relatively continuous position data.

Imager: An imager refers to an optical sensor that can measure light on an active area of the sensor and can measure optical signals along at least one axis or dimension. For example, a photo array can be defined as a one-dimensional imager, and a duo-lateral PSD can be defined as a two-dimensional imager.

Camera: A camera typically refers to a device including one or more imagers, one or more lenses, and associated support circuitry. Optionally, a camera can also include one or more optical filters and a housing or casing.

PSD camera: A PSD camera is a camera that uses a PSD.

Projector: A projector refers to an apparatus that projects light. A projector includes an emitter, a power source, and associated support circuitry. A projector can project one or more light spots on a surface.

Spot: A spot refers to a projection of light on a surface. A spot can correspond to an entire projection, or can correspond to only part of an entire projection.

Optical position sensor: An optical position sensor is a device that includes one or more cameras, a signal processing unit, a power supply, and support circuitry and can estimate its position, distance, angle, or pose relative to one or more spots.

DETAILED DESCRIPTION OF PREFERRED EMBODIMENTS

Although these methods and apparatus will be described in terms of certain preferred embodiments, other embodiments that are apparent to those of ordinary skill in the art, including embodiments that do not provide all of the benefits and features set forth herein, are also within the scope of the invention Embodiments advantageously use active optical beacons in position estimation. Advantageously, disclosed techniques minimize or reduce the line-of-sight limitation of conventional active optical beacon-based localization by projecting the light sources onto a surface that is observable from a relatively large portion of the environment. It will be understood that the light sources can include sources of light that are not visible to the naked eye, such as, for example, infrared (IR) sources. For example, in an indoor environment, it can be advantageous to project the emitted light from the beacon onto the ceiling. In many indoor environments, the ceiling of a room is observable from most locations with the room.

As an illustration, one can consider an application of the method and apparatus for an autonomous mobile robot such as a robotic vacuum cleaner. A common approach to self-docking and self-charging is to place active infrared (IR) beacons on the charging station, which the robot can sense with photo detectors, and use the associated sensory information to find the docking station. This approach suffers from line-of-sight limitations. If the robot and the docking station do not have line-of-sight separation, the robot cannot find its position relative to the docking station.

In one embodiment, the IR emitter can advantageously be placed in such a way that it projects onto the ceiling above the docking station, and a robot can have a photo detector that generally faces the ceiling or is capable of observing the ceiling. The robot can advantageously observe the IR projection on the ceiling even in the absence of line-of-sight separation between the robot and the docking station. In relatively many situations, the robot has a line-of-sight view of the ceiling, which enables the robot to detect the IR projection and move to the docking station for self-charging.

The method and apparatus described herein include numerous variations that differ in the type and number of active beacons used, differ in the type and number of optical sensors used for detection of reflected light, and differ in the type of signal processing used to determine the pose of an object. Embodiments of the method and apparatus include systems for estimation of the distance of an object relative to another object, estimation of the bearing of an object relative to another object, estimation of the (x, y) position of an object in a two-dimensional plane, estimation of the (x, y, z) position of an object in three-dimensional space, estimation of the position and orientation of an object in two dimensions or in three dimensions, estimation of the linear or angular velocity of an object, and estimation of the linear or angular acceleration of an object.

Embodiments of the method and apparatus are related to estimation of the position and orientation of a device, such as a mobile robot, relative to a global or a local coordinate system. The apparatus includes one or more optical sensors, one or more optical emitters, and signal processing circuitry. The initial position and orientations of the sensors can be unknown, and the apparatus and methods can be used to measure or estimate the position and orientation of one or more of the sensors and the position of the emitter projections on a surface.

In one embodiment, an optical sensor measures the optical signals generated by the optical emitters that are within the sensor's field of view by measuring the light that is projected onto a surface. By contrast, in a conventional system, such optical devices for distance or position measurement disadvantageously require line-of-sight between the emitter and the sensor. Advantageously, embodiments described herein can detect optical signals projected onto a surface, such as a ceiling of an indoor environment. The optical emitters can be configured to project one or more spots of light onto a surface that is observable by a sensor from a relatively large portion of the environment. The sensor detects the spot and estimates the sensor's position relative to the spot. The sensor can measure quantities such as the position of the spot in the sensor's reference frame and the intensity of the signal generated by the spot, and can associate a unique identifier with each spot. Each such measurement or set of measurements defines a relationship between the position of the sensor and the position of the spot. Using multiple such relationships defined between one or more sensors and one or more spots, signal processing circuitry can estimate the pose of at least one of the sensors, and, optionally, the position of one or more spots.

Embodiments of the method and apparatus described herein can vary in the number and type of optical sensors used, can vary in the number and type of optical emitters used, can vary in the projection of the light onto the sensor via, optionally, one or more spots, and can vary in the methods used for estimation of the distance, heading, position, orientation, velocity, angular velocity, acceleration, and angular acceleration of the sensor or sensors. For example, a light spot can be generated by an IR sensor that emits IR light onto a surface, and a photo detector can be used to detect the light reflected from the surface. With one emitter and one sensor, the distance and relative heading to the projected light can be measured. With two emitters and one two-dimensional sensor, the position of the sensor in a plane and the rotation of the sensor around an axis normal to that plane can be measured.

Embodiments of the method and apparatus described herein can use a wide variety of optical sensors. Some embodiments use digital or analog imaging or video cameras, such as CMOS imagers, CCD imagers, and the like. Other embodiments use PSDs, such as one-dimensional PSDs, angular one-dimensional PSDs, two-dimensional PSDs, quad PSDs, duo-lateral PSDs, tetra-lateral PSDs, and the like. Other embodiments use photo detectors.

In one embodiment, the optical sensor is combined with a lens and one or more optical filters to form a camera. For example, a PSD sensor can be enclosed in a casing with an open side that fits the lens and optical filters to filter incoming light and reduce effects of ambient light.

Embodiments of the method and apparatus described herein can also use a wide variety of optical emitters, including visible light devices, invisible light devices, laser light devices, infrared light devices, polarized light devices, light-emitting diodes (LEDs), laser diodes, light bulbs, halogen lights, projectors, and the like.

One embodiment of the method and apparatus described herein uses one two-dimensional PSD camera and a plurality of infrared (IR) emitters. Each IR emitter projects a spot onto the ceiling in a room. Each emitter is modulated with a unique pattern or frequency. The PSD camera is mounted, on a robot, for example, and faces the ceiling in such a way that its field of view intersects at least a portion of the plane that defines the ceiling onto which the spots are projected. The PSD camera provides an indication of the projected position of each observable spot in the camera sensor coordinates. In the illustrated embodiment, the position of each observed spot is defined as its centroid.

A camera position of each observed spot can correspond to the projection of a spot's position onto the image plane of the camera as defined by a corresponding perspective transformation. The PSD camera can measure the camera position of each spot. Using the measured camera positions of the spot and information related to the distance between the spots, the position (x, y) of the PSD camera in one plane and the rotation (θ) of the PSD camera around an axis normal to that plane can be determined. The position and orientation of the camera defined by (x, y, θ) is known as the pose of the camera.

For example, the PSD camera can be coupled to a mobile device such as a robot, and the device's pose can advantageously be relatively accurately determined within a room with two or more spots. Pose estimation, also known as localization, is an important component in many applications, including automated vacuuming, automated floor cleaning, telepresence, security, and entertainment. Without accurate position estimates, it is relatively difficult or impossible for a conventional robot to execute a path or trajectory because the conventional robot's internal position estimate tends to drift, and the conventional robot is generally unable to measure or account for the drift. For systematic floor coverage in a robotic vacuum cleaner, for example, a conventional robot without the ability to localize generally cannot maintain knowledge of the areas it has cleaned and the areas it has not cleaned, and the robot is therefore relatively likely to clean the same areas repeatedly and inefficiently and is relatively unlikely to clean other areas with sufficient frequency. Accordingly, many conventional robotic vacuum cleaners execute a random trajectory. By contrast, a robotic vacuum cleaner according to an embodiment with the ability to localize in a relatively accurate manner can follow a relatively efficient planned path. A robotic vacuum cleaner according to an embodiment can clean a room in a relatively efficient manner because it can track its path and can execute a planned, traversable path. Similarly, a mobile robot with the ability to localize can navigate to a desirable location and maintain a history of paths that it has taken.

Another embodiment of the method and apparatus described herein uses one two-dimensional PSD camera and one IR emitter. The IR emitter projects a spot on the ceiling, and the PSD camera faces the ceiling such that its field of view intersects at least a portion of the plane that defines the ceiling onto which the spot is projected. The PSD camera can provide indications for a measurement of the distance from the camera to the spot and the heading from the camera to the spot relative to the tangent of the circle with radius defined by the distance measurement. The distance measurement defines a circle centered at the spot projected onto the plane of the camera. In one example, the illustrated embodiment can be used for an application in which it is desired to position a device relative to the spot. Advantageously, when the camera is underneath the spot on the ceiling, then the camera position is at the center of the PSD camera. For example, if the spot is projected over a charging station, a mobile device can approach the charging station and recharge autonomously. In a related embodiment that further comprises wheel encoders, a robotic vacuum cleaner can move along concentric circles or move along a spiral to implement a floor coverage strategy that is relatively efficient, compared to a random coverage strategy.

While various embodiments have been and will be further described in the context of autonomous mobile robots, it will be understood by those of ordinary skill in the art that the principles and advantages set forth herein are applicable to other applications that benefit from position estimation, which are also within the scope of the invention.

DETAILED DESCRIPTIONS OF DRAWINGS

Examples of embodiments will now be described. FIG. 1 illustrates a block diagram of components of one embodiment of an apparatus. The apparatus includes a projector 111 and an optical position sensor 112. The projector 111 emits a light pattern 113 onto a surface 116, which creates a projected light pattern 119. In one embodiment, the light pattern 113 is modulated. The reflection 114 of the projected light pattern 119 is projected onto the optical position sensor 112.

The projector 111 includes a light source 102. By way of example, the light source 102 can correspond to a device, such as a laser device, an infrared device, and the like, that can be modulated by a modulator 101. Optionally, the light from the light source 102 can pass through one or more lenses 103 to project the light onto the surface 116.

The optical position sensor 112 includes a camera 117 and a processing unit 118. The camera 117 can detect and measure the intensity and position of the light 114 reflected from the surface 116 and can generate corresponding signals that are processed by the signal processing unit 118 to estimate the position of the optical position sensor 112 relative to the projected light pattern 119. It will be understood that the optical position sensor 112 can include multiple cameras 117 and/or multiple processing units 118.

The camera 117 includes an imager 104. The imager 104 can, for example, correspond to a CMOS imager, a CCD imager, an infrared imager, and the like. The camera can optionally include an optical filter 105 and can optionally include a lens 106. The lens 106 can correspond to a normal lens or can correspond to a special lens, such as a wide-angle lens, a fish-eye lens, an omni-directional lens, and the like. Further, the lens 106 can include reflective surfaces, such as planar, parabolic, or conical mirrors, which can be used to provide a relatively large field of view or multiple viewpoints. The lens 106 collects the reflected light 114 and projects it onto the imager 104. The optical filter 105 can constrain the wavelengths of light that pass from the lens 106 to the imager 104, which can advantageously be used to reduce the effect of ambient light, to narrow the range of light to match the wavelength of the light coming from the projector 111, and/or to limit the amount of light projected onto the imager 104, which can limit the effects of over-exposure or saturation. The filter 105 can be placed in front of the lens 106 or behind the lens 106. It will be understood that the camera 117 can include multiple imagers 104, multiple optical filters 105, and/or multiple lenses 106.

The signal processing unit 118 can include analog components and can include digital components for processing the signals generated by the camera 117. The major components of the signal processing unit 118 preferably include an amplifier 107, a filter 108, an analog-to-digital converter 109, and a microprocessor 110, such as a peripheral interface controller, also known as a PIC. It will be understood that the signal processing unit 118 can include multiple filters 108 and/or multiple microprocessors 110.

Embodiments of the apparatus are not constrained to the specific implementations of the projector 111 or the optical position sensor 112 described herein. Other implementations, embodiments, and modifications of the apparatus that do not depart from the true spirit and scope of the apparatus will be readily apparent to one of ordinary skill in the art.

Figure 2:
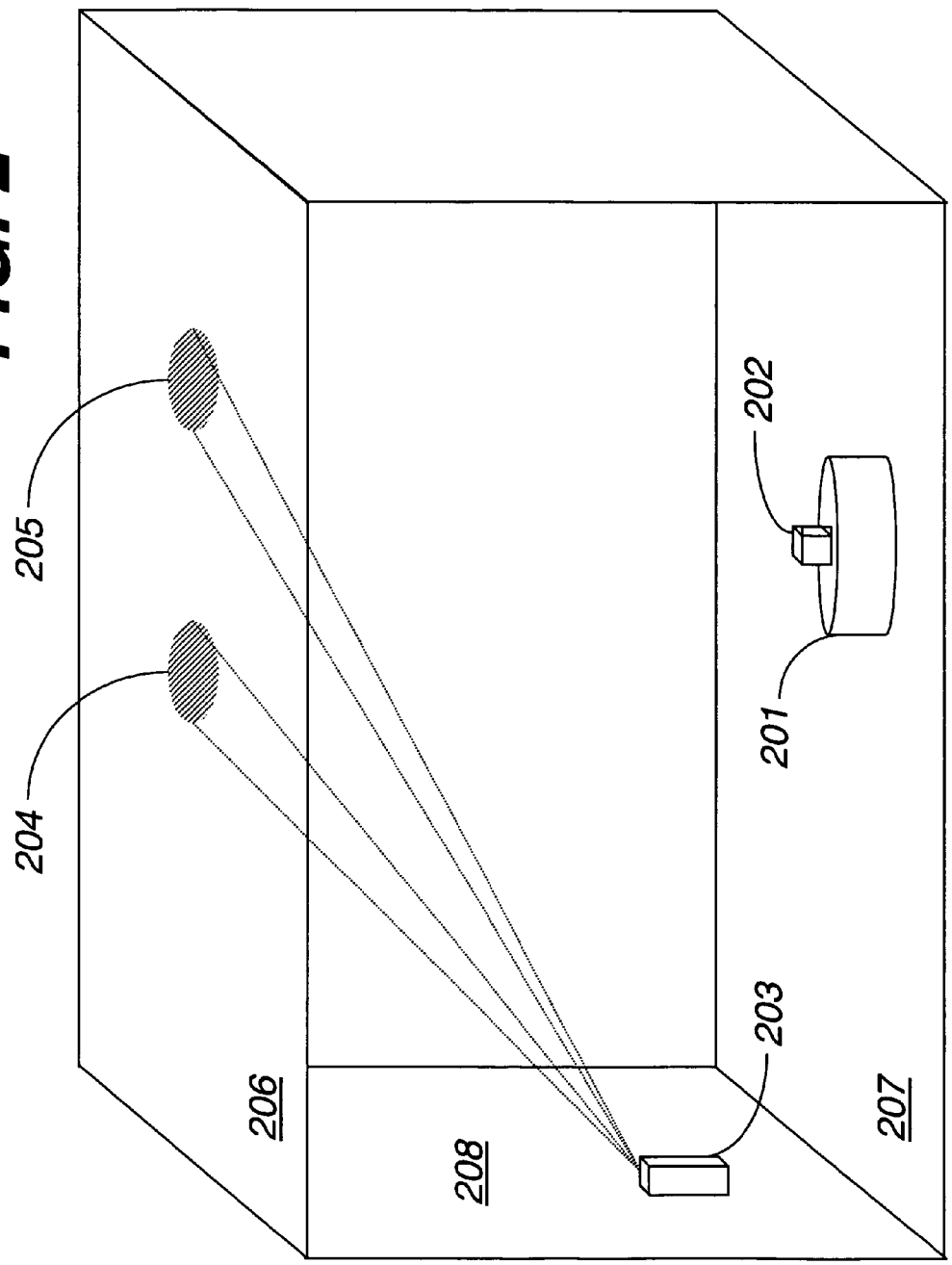
FIG. 2 illustrates an example of a use for the position estimation techniques.

FIG. 2 illustrates an example of a use for the position estimation techniques. An environment includes a ceiling 206, a floor 207, and one or more walls 208. In the illustrated environment, a projector 203 is attached to a wall 208. It will be understood that the projector 203 can have an internal power source, can plug into a wall outlet or both. The projector 203 projects a first spot 204 and a second spot 205 onto the ceiling 206. An optical position sensor 202 is attached to a robot 201. The optical position sensor 202 can detect the spots 204, 205 on the ceiling 206 and measure the position (x, y) of the robot 201 on the floor plane and the orientation θ of the robot 201 with respect to the normal to the floor plane. In one embodiment, the pose of the robot 201 is measured relative to a global coordinate system.

FIG. 3 describes a geometrical model associated with one embodiment of the method and apparatus described earlier in connection with FIG. 2. The ceiling 206 lies at a height h above the floor 207. A point $w_1$ 301 lies at the centroid of the first spot 204, and a point $w_2$ 302 lies at the centroid of the second spot 205. In the illustrated embodiment, a global coordinate system with an X axis, a Y axis, and a Z axis is defined and is also referred to as the global reference frame.

In one embodiment, it is convenient to define the Y axis such that the Y axis is parallel to the vector originating at the point $w_1$ 301 and passing through the point $w_2$ 302. Additionally, it is convenient to define the X axis such that the X axis is perpendicular to the Y axis and lies in the plane defined by the floor. Further, it is convenient to define the Z axis such that the positive Z direction is specified by the cross product of the unit vector in the X direction with the unit vector in the Y direction; in standard vector calculus notation, this relationship is expressed as $\hat{Z}=\hat{X}\times\hat{Y}$. Thus, in the illustrated coordinate system, the Z axis is normal to the floor plane and is directed from the floor to the ceiling. In the global coordinate system, an origin O is defined as the point having coordinates (0, 0, 0). Also in the global coordinate system, the point $w_1$ 301 is defined as having coordinates $(x_1, y_1, h)$, and the point $w_2$ 302 is defined as having coordinates $(x_2, y_2, h)$. Further, it is convenient to assume that the origin O is located directly below the point $w_1$ 301, so that $x_1=0$ and $y_1=0$. Additionally, the definition of the X axis implies that $x_2=0$ as well. Thus, the point $w_1$ 301 has the coordinates (0, 0, h), and the point $w_2$ 302 has the coordinates $(0, y_2, h)$. It will be understood that the aforementioned definitions can be made with no loss of generality.

A coordinate system relative to an imager is defined with a u axis, a v axis, and a z axis and can be referred to as the camera coordinate system or the camera reference frame. In the illustrated embodiment, the imager corresponds to a two-dimensional PSD sensor. In one embodiment, the height of the PSD sensor off the floor plane is relatively small compared to the ceiling height h, so the PSD sensor and the origin of the camera coordinate system use the coordinates (x, y, 0) and the orientation θ in the global coordinate system. The displacement from the origin of the global coordinate system to the origin of the camera coordinate system is denoted S; thus, $\|S\|=\sqrt{x^2+y^2}$, where $\|S\|$ denotes the norm, or magnitude, of the vector S. The point $c_1$ 311 represents the projection of the point $w_1$ 301 onto the imager, and the point $c_2$ 312 represents the projection of the point $w_2$ 302 onto the imager. The point $c_1$ 311 has the coordinates $(u_1, v_1, 0)$ in the camera reference frame, and the point $c_2$ 312 has the coordinates $(u_2, v_2, 0)$ in the camera reference frame. It will be understood that the aforementioned definitions can be made with no loss of generality.

In one embodiment, the spots 204, 205 can be identified using unique signals or unique signatures. For example, the emitters that produce the spots 204, 205 can be on-off modulated with different frequencies. The emitter that produces the first spot 204 can be modulated with a first frequency $f_1$, and the emitter that produces the second spot 205 can be modulated with a second frequency $f_2$, wherein the first frequency and the second frequency are different; that is $f_1 \neq f_2$.

At this point, it should be noted that the ceiling height h and the separation $y_2$ between the point $w_1$ 301 and the point $w_2$ 302 can be determined in a variety of ways. For example, if the mobile robot 201 using the optical position sensor is capable of producing wheel odometry estimates, then the robot 201 can estimate h and $y_2$ using measurements or observations of the points $w_1$ 301 and $w_2$ 302 from multiple positions. Other appropriate techniques will be readily determined by one of ordinary skill in the art.

Exemplary Position Estimation Using the Method and Apparatus

With reference to the coordinate systems, distances, angles, and points described earlier in connection with FIG. 3, the PSD camera can measure $c_1$ and $c_2$, which correspond to the projections of $w_1$ and $w_2$ onto the PSD sensor. In one embodiment, a goal of the method is to determine S, the position of the PSD camera in the global reference frame.

In one embodiment, the PSD measures the coordinates of the centroid of the light projected onto the PSD by generating electrical current proportional to the position and intensity of the light centroid. The associated processing can be accomplished in a wide variety of ways, including analog circuitry, digital circuits, hardware, software, firmware, and combinations thereof. For example, a microcontroller, a microprocessor, a CPU, a general-purpose digital signal processor, dedicated hardware, and the like can be used.

To measure the centroids of multiple spots, a number of conditions are preferable. First, the sensor preferably does not become saturated with light, ambient or otherwise. In one embodiment, this is accomplished by using optical filters to reduce or minimize unwanted light sources that project onto the active area of the PSD sensor and by biasing the PSD to increase the light level at which it becomes saturated. Second, to measure the position of a particular light source reliably, it is preferable to isolate the light source from other light sources by reducing or eliminating the effect of other light sources, which can include ambient light and light generated by other spots. One approach is to isolate one light source is to modulate the light source with a unique pattern such that it is distinguished from other light sources. If the i-th emitter on-off modulates the projected light with a frequency $f_i$, the PSD sensor can extract the signal generated by filtering a signal using a band-pass filter with lower and upper frequencies of $f_i-w$ and $f_i+w$, respectively, where 2w corresponds to the width of the corresponding band-pass filter. The signal processing unit of the PSD can use the filter to suppress signals with frequencies outside the frequency range defined by the band-pass filter. The filtering of the PSD signal can occur either before or after the PSD currents are converted into associated centroid positions. In one embodiment, where the first emitter is modulated at a frequency $f_1$ and the second emitter is modulated at a frequency $f_2$, and wherein $f_1 \neq f_2$, the signal processing unit filters the signal specified by $f_1$ to measure $c_1$, the centroid of the first spot, and filters the signal specified by $f_2$ to measure $c_2$, the centroid of the second spot.

Exemplary Method for Pose Estimation

In one embodiment, the apparatus includes N emitters, which project N light spots, and M cameras. The position of the i-th camera in the global reference frame is denoted herein by $S_i=(x_i, y_i, z_i)$, and the rotational orientation of the i-th camera in the global reference frame is denoted herein by $R_i=(\alpha_i, \beta_i, \theta_i)$. The position of the j-th light spot is denoted herein by $w_j$, and the position of the projection of the j-th spot onto the i-th camera is denoted herein by $c_{i,j}$. Then, the following relationship relates $S_i$, $w_j$, and $c_{i,j}$.

$$c_{i,j}=P_i R_i(w_j-S_i) \qquad \text{Equation 1}$$

In Equation 1, $R_i$ represents the three-degree-of-freedom rotation transformation, which, in one embodiment, results from the composition of three mutually orthogonal one-degree-of-freedom rotation transformations, such as $R_i=R_\alpha R_\beta R_\theta$. Also in Equation 1, $P_i$ represents the perspective transformation associated with the i-th camera. Thus, Equation 1 defines three equations for six unknowns, in which the unknowns are $x_i$, $y_i$, $z_i$, $\alpha_i$, $\beta_i$, and $\theta_i$. In a system with N spots and M cameras, N×M such matrix equations can be formulated, but not all such equations are necessarily unique, independent, and non-degenerate. Thus, with two spots and one camera, values for x, y, and θ can be determined. To determine all six degrees of freedom, it is preferable to have a configuration of spots and cameras that generates at least six independent, non-degenerate equations analogous to Equation 1.

Exemplary System with Two Emitters and One Camera

In one embodiment, the system includes two spots projected onto the ceiling and one optical position sensor with one PSD camera. The relationship between a spot $w_j$ and its projection $c_j$ in the PSD camera reference frame is given by the following equation.

$$c_j=PR_\theta(w_j-S) \qquad \text{Equation 2}$$

In Equation 2, S represents the position of the PSD camera in the global reference frame, and P represents the transformation from a point (X, Y, Z) in the global coordinate system to a point (u, v, z) in the PSD camera reference frame. Also, for the purposes of this example, the z axis of the camera coordinate system is aligned with the Z axis of the global coordinate system in the vertical direction. This implies that $R_\alpha$ and $R_\beta$ correspond to identity matrices; accordingly, $R_\alpha$ and $R_\beta$ have been omitted from Equation 2. In the case of a pinhole camera model, P corresponds to the scalar value $\lambda/(\lambda-Z)$, where $\lambda$ represents the focal length of the camera. It will be understood that multiplication by a scalar value can also be achieved by multiplication by the corresponding multiple of the appropriately-dimensioned identity matrix. Also in Equation 2, $R_\theta$ can be represented by the following unitary matrix.

$$R_\theta = \begin{pmatrix} \cos\theta & \sin\theta & 0 \\ -\sin\theta & \cos\theta & 0 \\ 0 & 0 & 1 \end{pmatrix} \qquad \text{Equation 3}$$

Equation 2 can be re-written as follows.

$$w_j-S=R_\theta^{-1}P^{-1}c_j \qquad \text{Equation 4}$$

In Equation 4, $P^{-1}$ represents the inverse perspective transformation, and $R_\theta^{-1}$ represents the inverse rotation transformation. When the position of the i-th spot is associated with appropriate camera parameters, such as the camera focal length in a pinhole camera model, then Equation 4 defines two non-degenerate equations in three unknowns x, y, and θ for each measurement $c_j$. Thus, the three variables, x, y, and θ, together determine the pose of the PSD camera.

Because two equations in three unknowns do not define a unique solution for the pose of the PSD camera, it is preferable to use more independent equations than unknowns. With two spots and one PSD camera, it is possible to generate four equations in three unknowns as follows.

$$w_1-S=R_\theta^{-1}P^{-1}c_1 \qquad \text{Equation 5}$$

$$w_2-S=R_\theta^{-1}P^{-1}c_2 \qquad \text{Equation 6}$$

Equation 5 relates the spot $w_1$ with its associated PSD camera position $c_1$, and Equation 6 relates the spot $w_2$ with its associated PSD camera position $c_2$. Subtracting Equation 5 from Equation 6 generates the following matrix equation expressed in Equation 7.

$$w_2-w_1=R_\theta^{-1}P^{-1}(c_2-c_1) \qquad \text{Equation 7}$$

Equation 7 can be expanded as follows.

$$\begin{pmatrix} 0 \\ \Delta y \\ 0 \end{pmatrix} = R_\theta^{-1} P^{-1} \begin{pmatrix} \Delta u \\ \Delta v \\ 0 \end{pmatrix} \quad \text{Equation 8}$$

The matrix equation given in Equation 8 expresses two non-degenerate linear equations. In Equation 8, $\Delta y = d = y_2 - y_1$, $\Delta u = u_2 - u_1$, and $\Delta v = v_2 - v_1$. As discussed earlier in connection with FIG. 3, d represents the distance that separates the two spots. Accordingly, the first of the two non-degenerate linear equation defined by Equation 8 is given by the following.

$$0 = P^{-1}(\Delta u \cos \theta - \Delta v \sin \theta) \quad \text{Equation 9}$$

Solving for $\theta$ in Equation 9 gives $\theta = \tan^{-1}(\Delta u/\Delta v)$, and substituting this result into Equation 5 provides the following solution for S, the position of the PSD camera in the global reference frame.

$$S = w_1 - R_\theta^{-1} P^{-1} c_1 |_{\theta = \tan^{-1}(\Delta u/\Delta v)} \quad \text{Equation 10}$$

Accordingly, the pose (x, y, $\theta$) of the PSD camera as a function of the measurements $c_1$ and $c_2$ can be determined using Equation 9 and Equation 10.

An Example of Using One Emitter and One Camera

In one embodiment, the system includes one spot projected onto the ceiling and one optical position sensor with one PSD camera. Similar to the relationship discussed earlier in connection with Equation 2, the relationship between the spot w and its projection c in the PSD camera reference frame is given by the following equation.

$$c = P R_\theta (w - S) \quad \text{Equation 11}$$

Because the origin of the global coordinate system can be chosen, without loss of generality, such that the spot w is located directly above the origin, rearranging Equation 11 provides the following solution for S.

$$w - S = R_\theta^{-1} P^{-1} c \quad \text{Equation 12}$$

Equation 12 can be rewritten in coordinate notation to give the following relationship.

$$\begin{pmatrix} -x \\ -y \\ z \end{pmatrix} = \begin{pmatrix} \cos\theta & -\sin\theta & 0 \\ \sin\theta & \cos\theta & 0 \\ 0 & 0 & 1 \end{pmatrix} P^{-1} \begin{pmatrix} u \\ v \\ 0 \end{pmatrix} \quad \text{Equation 13}$$

Thus, Equation 13 specifies two non-degenerate linear equations. In the case that $P^{-1}$ corresponds to a scalar or to a scalar multiple of an identity matrix, squaring and summing the two non-degenerate linear equations and simplifying the result yields the following.

$$x^2 + y^2 = (P^{-1})^2[(u\cos\theta - v\sin\theta)^2 + (u\sin\theta + v\cos\theta)^2] = (P^{-1})^2(u^2 + v^2) \quad \text{Equation 14}$$

Because $x^2 + y^2$ is equal to $\|S\|^2$ and $u^2 + v^2$ is equal $\|c\|^2$, Equation 14 can be simplified to $\|S\|^2 = (P^{-1})^2 \|c\|^2$, or $\|S\| = P^{-1}\|c\|$.

Thus, the distance measurement $\|c\|$, and the corresponding distance measurement $\|S\|$, can define a circle in an x-y plane centered at the origin (0, 0) with radius $\|S\|$. A tangent to the circle at the position of the sensor at the position of the sensor (that is, at S), is orthogonal to the vector $s = (x\ y)^T$, where the superscripted "T" denotes the vector or matrix transposition operation. The tangent $\hat{s}$ can therefore be expressed as $\hat{s} = (y - x)^T$. The rotational orientation, $\phi$, of the robot of the robot with respect to $\hat{s}$ can then be estimated using a measurement of c as given in the following relationship.

$$\phi = \tan^{-1}(u/v) \quad \text{Equation 15}$$

Thus, in this embodiment, $\|S\|$ and $\phi$ can be determined, which can advantageously support applications for robotics, person tracking, object tracking, and the like. In one example, the spot is projected onto the ceiling directly above a docking station, and the optical position sensor with one PSD camera is attached to a robot. Using the estimation of $\|S\|$ and $\phi$, the robot can guide itself to turn toward the spot and approach the spot. In this manner, the robot can approach the docking station and recharge itself. In an alternative example, the projector can correspond to a handheld projector and can be used to point above a user-selected object or location of interest to guide to the robot to the object or location. This alternative example provides a powerful interface for robot interaction.

Examples of Other Embodiments of the Invention

One embodiment of the method and apparatus includes a camera, such as a CCD camera, a CMOS camera, and the like, and a projector that generates a pattern on a projection surface, such as a ceiling. It will be understood that this embodiment can include multiple cameras and/or multiple projectors. By way of example, the projector can correspond to a slide projector, and the pattern can be encoded in a slide. In one embodiment, at least one pattern has the shape of a circle, and in another embodiment, at least one pattern has the shape of a square. Each camera generates grayscale or color images. A signal processing unit processes the camera images, extracts the unique patterns, and estimates a position of the pattern in camera sensor coordinates. The position of the pattern can be defined as the centroid of the pattern. The position of the j-th pattern in the global reference frame can be denoted herein by and the position of the j-th pattern in the reference frame of the i-th camera can be denoted herein by $c_{i,j}$. Then, the relationship between the j-th pattern and its projection onto the i-th camera is defined by Equation 1. The signal processing unit captures the camera images and processes the images using one or more image analysis techniques to detect and extract the position of known patterns. The image analysis techniques can include, by way of example, line and corner detection (to detect a square pattern, for example), Hough transform (to detect a circle, for example), and the like. After the positions of the patterns in the camera reference frames are determined, the signal processing unit can estimate the positions of the cameras with respect to the global reference frame using the methods described previously. Optionally, one or more of the projectors can modulate on-off to reduce the effects of ambient light. The modulation frequencies can advantageously be used to associate a unique identifier with each pattern. In one embodiment, the identifier of a pattern is advantageously encoded within the pattern itself. As an example, the shape of the pattern can define a unique identifier, if distinct shapes are used for each pattern. For example, the system can distinguish between a square pattern and a circular pattern and associate different identifiers with each pattern.

In one embodiment, the modulation frequency of the projector can encode information, such as bit patterns to transmit a message that can be detected and extracted by the camera and the signal processing unit. The bit patterns can be modulated in the signal using any of a variety of common modulation techniques, such as pulse width modulation, space width modulation, and phase modulation.

In another embodiment, the bit patterns are modulated on top of the original "carrier" frequency of the spot. The projectors and optical position sensors can advantageously be used for optical wireless communication. In this embodiment, the projector projects the light pattern on a reflecting surface, and the optical sensor detects the signal by viewing the reflecting surface, which eliminates the need for line-of-sight between the emitter and the sensor. The signal modulated in the projected light can carry commands, such as commands for a robot, similar to the way in which light modulated by a remote control unit can carry commands to an appliance. In one example, the projection of the spot on the ceiling directly above a docking station enables the robot to find the docking station and perform self-charging. In addition, an interface with the docking station, such as a button on the docking station, can generate a command to the robot to return to the charging station.

Yet another embodiment of the method and apparatus includes a projector for one or more distinct regions of an environment, such as a projector for each distinct region. Advantageously, this embodiment expands the coverage of localization throughout relatively large areas or throughout multiple relatively confined areas, such as multiple rooms. The covered area associated with one projector can be constrained by the field of view of the camera, the distance from the projector to the reflection surface, and the presence of objects and walls that obstruct the camera's view of the spot. Increasing the number of light patterns can increase the coverage area. In one embodiment, for coverage across multiple rooms, one or more projectors are provided for each room in which coverage is desired, so that, for example, each room can have a dedicated projector. For example, each projector can project one or more spots that have an identifier that is unique within the room. It will be understood that the identifier associated with a spot can be based on the spot's modulation frequency, the spot's shape, the spot's color, or another appropriate characteristic that can be detected by the camera sensor.

In one implementation, the combination of the individual spot identifiers with a room can define a unique identifier for the room. By way of example, a first room can have two spots having associated unique identifiers "A" and "B," and a second room can have two spots having associated unique identifiers "A" and "C." The unique identifiers for each room can advantageously be used by a system, such as by a robot, to build a topological map of the rooms and the connectivity of the rooms. Without a unique identifier for each room or region, the system can disadvantageously generate ambiguous position information. As an illustration, without a unique identifier for each room, the position associated with an (x, y) coordinate of a first room can generally not be distinguished from the position associated with the (x, y) coordinate of a second room.

Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. A location estimation system for estimating a location of a self-propelled object, the system comprising:
   a first guidance device comprising:
      a first modulator;
      a first light source coupled to the first modulator,
         wherein the first modulator is configured to modulate light of the first light source using a first modulation;
         wherein the first light source is configured to project modulated light,
         whereby a first spot is projected onto a first surface when the first light source is positioned for operation with the self-propelled object;
   a second guidance device comprising:
      a second modulator;
      a second light source coupled to the second modulator,
         wherein the second modulator is configured to modulate light of the second light source using a second modulation, the second modulation distinct from the first modulation;
         wherein the second light source is configured to project modulated light,
         whereby a second spot is projected onto a second surface when the second light source is positioned for operation with the self-propelled object;
   a first detector configured to:
      detect the first light spot based at least in part on the first modulation;
      detect the second light spot based at least in part on the second modulation;
   a data processing unit configured to:
      determine that the self-propelled object is in a first room at least partly in response to detecting the first light spot;
      determine a first location of the self-propelled object based at least in part on the first light spot;
      determine that the self-propelled object is in a second room at least partly in response to detecting the second light spot; and
      determine a second location of the self-propelled object based at least in part on the second light spot.

2. The location estimation system as defined in claim 1, wherein:
   the first modulation provides a differing light intensity, light pattern, wavelength, or combination thereof as compared to the second modulation;
   the location estimation system is configured to distinguish the first light spot from the second light spot based on the first modulation and the second modulation;
   the location estimation system is configured to determine the position of the self-propelled object, wherein the position includes a heading, orientation, distance measurement, speed of the object, or combination thereof;
   the first light source comprises at least one light-emitting diode (LED), infrared light device, polarized light device, laser diode, or combination thereof;
   the self-propelled object is an autonomous robot; and
   the location estimation system is configured to determine the robot's position relative to a reference coordinate system for localization.

3. The location estimation system as defined in claim 1, wherein the location estimation system is further configured to build a topological map including connectivity of the first room and the second room.

4. The location estimation system as defined in claim 1, wherein the first surface is a ceiling.

5. The location estimation system as defined in claim 1, wherein the first modulation is a first frequency modulation and the second modulation is a second frequency modulation.

6. The location estimation system as defined in claim 1, wherein the first modulation is a first pattern.

7. The location estimation system as defined in claim 1, wherein the first light spot comprises at least two light spots, and the second light spot comprises at least two light spots.

8. The location estimation system of claim 1, wherein the first light source further comprises a collimating lens.

9. The location estimation system as defined in claim 1, wherein the location estimation system is configured to perform pose estimation of the self-propelled object.

10. The location estimation system of claim 1, wherein the first detector includes a plurality of photodetectors.

11. The location estimation system of claim 1, wherein the location estimation system is configured to maintain a history of paths traversed by the self-propelled object.

12. The location estimation system as defined in claim 1, wherein the self-propelled object is a floor cleaning device.

13. The location estimation system as defined in claim 1, wherein the first detector is mounted on the self-propelled object.

14. A method of estimating a location of a self-propelled object, the method comprising:
in a first guidance device:
modulating light of a first light source via a first modulator using a first modulation;
projecting first modulated light from the first light source to form a first spot on a first surface;
in a second guidance device:
modulating light of a second light source via a second modulator using a second modulation;
projecting second modulated light from the second light source to form a second spot on a second surface;
detecting the first light spot based at least in part on the first modulation;
detecting the second light spot based at least in part on the second modulation;
determining that the self-propelled object is in a first room at least partly in response to detecting the first light spot;
estimating a first location of the self-propelled object based at least in part on the first light spot;
determining that the self-propelled object is in a second room at least partly in response to detecting the second light spot; and
estimating a second location of the self-propelled object based at least in part on the second light spot.

15. The method as defined in claim 14, wherein:
the first modulation provides a differing light intensity, light pattern, wavelength, or combination thereof as compared to the second modulation,
the first light source comprises at least one light-emitting diode (LED), infrared light device, polarized light device, laser diode, or combination thereof,
the self-propelled object is an autonomous robot,
the method further comprising:
distinguishing the first light spot from the second light spot based on the first modulation and the second modulation;
determining the position of the self-propelled object, wherein the position includes a heading, orientation, distance measurement, speed of the object, or combination thereof; and
determining the robot's position relative to a reference coordinate system for localization.

16. The method as defined in claim 14, the method further comprising building a topological map including connectivity of the first room and the second room.

17. The method as defined in claim 14, wherein the first surface is a ceiling.

18. The method as defined in claim 14, wherein the first modulation is a first frequency modulation and the second modulation is a second frequency modulation.

19. The method as defined in claim 14, wherein the first modulation is a first pattern.

20. The method as defined in claim 14, wherein the first light spot comprises at least two light spots, and the second light spot comprises at least two light spots.

* * * * *

UNITED STATES PATENT AND TRADEMARK OFFICE
CERTIFICATE OF CORRECTION

PATENT NO. : 8,295,955 B2
APPLICATION NO. : 13/204075
DATED : October 23, 2012
INVENTOR(S) : DiBernardo et al.

It is certified that error appears in the above-identified patent and that said Letters Patent is hereby corrected as shown below:

On the Title Page (Item 73, Assignee) at line 1, Change "Evolutions" to --Evolution--.

In the Specification

In column 3 at line 63-64, Change "invention" to --invention.--.

In column 11 at line 21, Change " $S = w_1 - R_\theta^{-1} P^{-1} c_1 |_{\theta = \tan^{-1}(\Delta u / \Delta v)}$ ,, to -- $S = w_1 - R_\theta^{-1} P^{-1} c_1 |_{\theta = \tan^{-1}(\Delta u / \Delta v)}$ --.

In Column 12 at line 37, Change "by" to --by $w_j$,--.

Signed and Sealed this
Twenty-fourth Day of December, 2013

Margaret A. Focarino
*Commissioner for Patents of the United States Patent and Trademark Office*